United States Patent
Pace et al.

(10) Patent No.: US 10,050,288 B2
(45) Date of Patent: Aug. 14, 2018

(54) SYSTEMS AND METHODS FOR DETECTING LEAKS IN A FUEL CELL SYSTEM

(71) Applicant: GM GLOBAL TECHNOLOGY OPERATIONS LLC, Detroit, MI (US)

(72) Inventors: Stephen D. Pace, Troy, MI (US); Jun Cai, Fairport, NY (US); Manish Sinha, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 526 days.

(21) Appl. No.: 14/589,777

(22) Filed: Jan. 5, 2015

(65) Prior Publication Data

US 2016/0197366 A1    Jul. 7, 2016

(51) Int. Cl.
| | |
|---|---|
| *H01M 8/04664* | (2016.01) |
| *H01M 8/0438* | (2016.01) |
| *H01M 8/04746* | (2016.01) |
| *H01M 8/04858* | (2016.01) |
| *H01M 8/04089* | (2016.01) |

(52) U.S. Cl.
CPC ... *H01M 8/04104* (2013.01); *H01M 8/04388* (2013.01); *H01M 8/04402* (2013.01); *H01M 8/04432* (2013.01); *H01M 8/04679* (2013.01); *H01M 8/04753* (2013.01); *H01M 8/04783* (2013.01); *H01M 8/04895* (2013.01); *H01M 8/04952* (2016.02); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2009/0169927 A1* | 7/2009 | Sato | H01M 8/04104 429/412 |
| 2014/0162171 A1 | 6/2014 | Di Fiore et al. | |
| 2016/0172696 A1* | 6/2016 | Milacic | H01M 8/04992 429/431 |

\* cited by examiner

*Primary Examiner* — Barbara L Gilliam
*Assistant Examiner* — Helen M McDermott
(74) *Attorney, Agent, or Firm* — Phillips Ryther & Winchester; Jared L. Cherry (57) ABSTRACT

Systems and methods for detecting and validating a leak in a fuel cell system are presented. In certain embodiments, various fuel cell stack set points may be adjusted such that adequate $H_2$ flow data may be obtained to identify and validate an $H_2$ leak and/or a location of such a leak. In some embodiments, $H_2$ flow data may be obtained by adjusting certain fuel cell system operating parameters under a variety of operating conditions and/or modes and measuring flow data under such various operational conditions.

12 Claims, 4 Drawing Sheets

SYSTEMS AND METHODS FOR DETECTING LEAKS IN A FUEL CELL SYSTEM

TECHNICAL FIELD

This disclosure relates to systems and methods for detecting and validating leaks in a fuel cell system. More specifically, but not exclusively, this disclosure relates to systems and methods for detecting and validating leaks in an anode subsystem of a fuel cell system.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., using electric drive motors and the like) and/or via an intermediate battery system. Hydrogen is one possible fuel that may be used in a FC system. Hydrogen is a clean fuel that can be used to efficiently produce electricity in a FC system. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

The ability to identify and mitigate leaks from an anode subsystem is a consideration in achieving continued PEMFC system performance and compliance with certain emission regulatory requirements. Particularly, a hydrogen ("$H_2$") leak in an anode subsystem may, among other things, reduce overall PEMFC system efficiency and/or increase $H_2$ emission concentration. Regulatory requirements may necessitate accurate identification of $H_2$ leaks in a PEMFC system to, among other things, ensure that certain reactive and/or mitigating actions are taken when $H_2$ is lost from the anode subsystem and/or to reduce the occurrence of false leak detection. Conventional methods for identifying PEMFC leaks, however, may be limited to identifying leaks during PEMFC run time, and may not utilize adequate anode $H_2$ flow data to identify and validate a leak and/or a location of a leak in a PEMFC system with sufficient accuracy.

SUMMARY

Systems and methods presented herein may be utilized in connection with identifying leaks in an anode subsystem of a PEMFC system. More particularly, embodiments of the disclosed systems and methods may be utilized in connection with identifying and validating $H_2$ leaks in a PEMFC system. In some embodiments, a PEMFC system may include an anode compartment and a cathode compartment.

As used herein, a PEMFC system may include a single cell or, alternatively, may include multiple cells arranged in a stack configuration. The FC stack may receive a cathode input gas, typically a flow of air forced through the stack by a compressor. Oxygen that is not consumed by the stack and/or a portion of the air may be output as a cathode exhaust gas that may include water as a stack by-product. The FC stack also receives an anode $H_2$ input gas that flows into the anode side of the stack.

A FC stack may include a series of bipolar plates positioned between several membrane electrode assemblies (e.g., an assembly of an anode catalytic mixture, a cathode catalytic mixture, and a membrane). The bipolar plates include an anode side and a cathode side for adjacent FCs in the stack. Anode gas flow channels may be provided on the anode side of the bipolar plates that allow anode reactant gas to flow to respective membrane electrode assemblies. Cathode gas flow channels may be provided on the cathode side of the bipolar plates that allow the cathode reactant gas to flow to the respective membrane electrode assemblies. One end plate may include anode gas flow channels, and the other end plate may include cathode gas flow channels. The bipolar plates and end plates may be made of a conductive material, such as stainless steel or a conductive composite. The end plates may conduct the electricity generated by the FCs out of the stack. The bipolar plates also may further include flow channels through which a cooling fluid may flow.

In certain embodiments, a method for validating a leak in an anode subsystem of a FC system may include determining that a first measured leak flow rate in the anode subsystem exceeds a first reference flow rate threshold. An anode-to-cathode pressure bias and a current density of the FC system may be adjusted to reference levels. After adjusting the anode-to-cathode pressure bias and current density to the reference levels, a second measured leak flow rate may be measured.

A plurality of measured leak flow rates obtained at a plurality of anode-to-cathode pressure bias levels may be compared with the second measured leak flow rate. For example, in some embodiments, the anode-to-cathode pressure bias may be increased. After increasing the anode-to-cathode pressure bias, it may be determined that a third measured leak flow rate exceeds the second measured leak flow rate. The anode-to-cathode pressure bias may then be decreased. After decreasing the anode-to-cathode pressure bias, it may be determined that a fourth measured leak flow rate is less than the second measured flow rate and third measured leak flow rate. Based on the comparison of the plurality of measured leak flow rates and the second measured leak flow rate, a leak may be identified.

In some embodiments, the method may further comprise identifying a leak location in the FC system. For example, in certain embodiments, a pressure in the cathode subsystem of the FC system may be increased. After increasing the pressure in the cathode subsystem, a fifth measured leak flow rate may be measured. It may be determined that the fifth measured leak flow rate is substantially similar to the second measured leak flow rate and, based on the determination, a leak location in the cathode subsystem may be identified. In further embodiments, it may be determined that the fifth measured leak flow rate is greater than the second measured leak flow rate and, based on the determination, a leak location in the anode subsystem may be identified.

In further embodiments, the method may further comprise confirming and/or otherwise validating the identified leak.

For example, a pressure decay rate of the anode subsystem during a shutdown operation of the FC system may be monitored. An identified leak may be confirmed and/or otherwise validated based on a determination that the decay rate is faster than a reference threshold decay rate.

In yet further embodiments, the method may comprise implementing at least one protective action in response to identifying the leak to mitigate damage to the FC system. For example, in response to identifying a leak, a shutdown operation may be initiated in the FC system. In further embodiments, injection of hydrogen in the FC system may be promptly terminated in response to identifying a leak.

In certain embodiments, the aforementioned method may be performed, at least in part, by control electronics associated with a PEMFC system and/or implemented using a non-transitory computer-readable medium storing associated executable instructions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods provided herein may be utilized in connection with detecting, validating, and/or managing a leak of $H_2$ in an anode subsystem of a PEMFC system. In certain embodiments, various FC stack set points may be adjusted such that adequate $H_2$ flow data may be obtained to identify and validate an $H_2$ leak and/or a location of such a leak based, at least in part, on the flow data. In some embodiments, such $H_2$ flow data may be obtained by adjusting certain PEMFC system operating parameters (e.g., system pressures and/or power levels) under a variety of operating conditions and/or modes (e.g., FC stack run, idle/standby, and/or shutdown modes) and measuring flow data under such various operational conditions.

Figure 1:
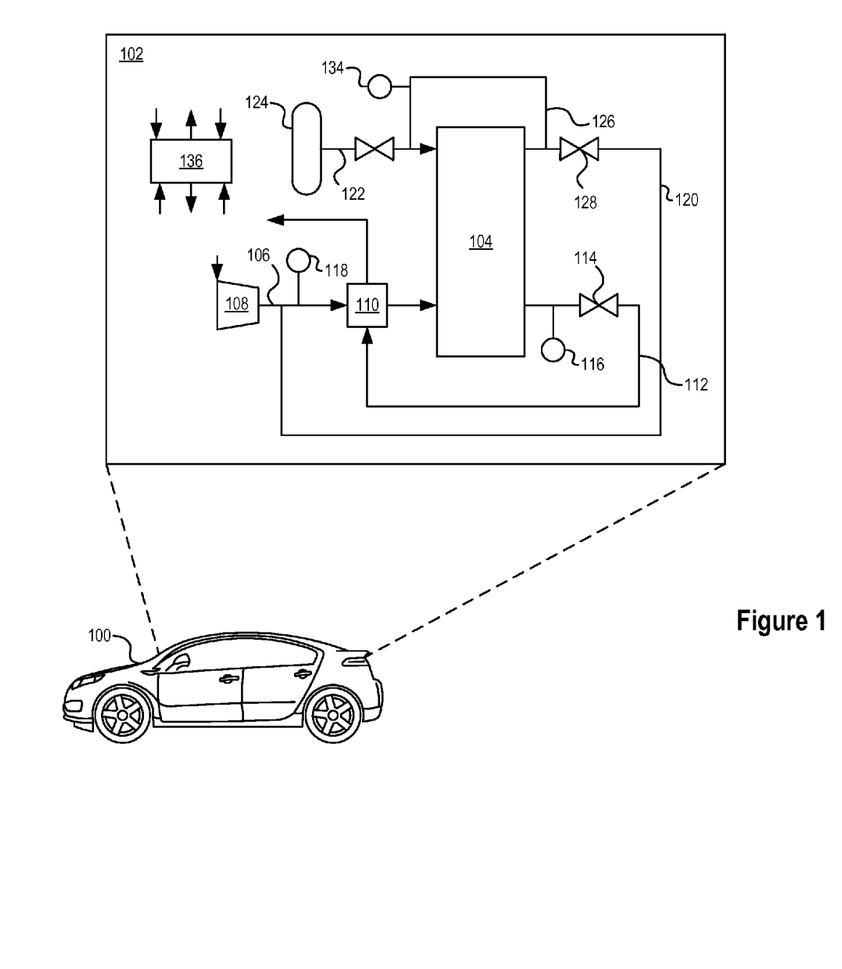
FIG. 1 illustrates a diagram of a PEMFC system consistent with embodiments disclosed herein.

FIG. 1 illustrates a diagram of a PEMFC system 102 included in a vehicle 100 consistent with embodiments disclosed herein. The vehicle 100 may be a motor vehicle, a marine vehicle, an aircraft, and/or any other type of vehicle, and may include any suitable type of drivetrain for incorporating the systems and methods disclosed herein. Additional embodiments of the disclosed systems and methods may be utilized in connection with any other type of FC system including, for example, stationary FC systems (e.g., generators). As illustrated, vehicle 100 may include a PEMFC system 102 configured to provide electrical power to certain components of the vehicle 100. For example, the PEMFC system 102 may be configured to provide power to electric drivetrain components of the vehicle 100.

In some embodiments, the PEMFC system 102 may be configured to directly provide power to electric drivetrain components. In certain embodiments, the PEMFC system 102 may be configured to provide power to electric drivetrain components via an intermediate battery system (not shown). In further embodiments, the PEMFC system 102 may be configured to provide power to one or more other battery systems including low voltage battery systems (e.g., lead-acid 12V automotive batteries) that supply electric energy to a variety of vehicle 100 systems including, for example, electric coolant pumps, lighting systems, audio systems, and/or the like.

The PEMFC system 102 may include a single cell or multiple cells arranged in a PEMFC stack 104 configuration, and may include certain PEMFC system elements and/or features described above. The FC stack 104 may include an anode side and a cathode side. A compressor 108 may provide an airflow to the cathode side of the FC stack 104 on a cathode input line 106 through a water vapor transfer ("WVT") unit 110 that humidifies the cathode input air. Cathode exhaust gas may be output from the FC stack 104 via a cathode exhaust gas line 112 through a backpressure valve 114. A pressure sensor 116 may measure the pressure of the cathode exhaust gas line 112.

The anode side of the FC stack 104 may receive hydrogen gas from a hydrogen source 124 on an anode input line 122 and provide an anode recirculation gas on an anode recirculation line 126. When a purge or bleed of the gases in the anode side of the stack 104 are desired, anode exhaust gas may be bled into the cathode line 106 through a valve 128 that may be provided in an anode exhaust line 120. A pressure sensor 134 may be provided in a location in the anode subsystem, such as in the anode recirculation line 126, to measure a pressure of the anode side of the FC stack 104.

The PEMFC system 102 and/or associated systems and/or components may be communicatively coupled with an associated control system 136. The control system may be configured to monitor and control certain operations of the PEMFC system 102 and/or associated systems and/or components. For example, among other operations, the control system 136 may receive pressure information signals from pressure sensors 116, 118, 134 and control various operations of the FC stack 104 based, at least in part, on such information. For example, the control system 136 may be configured to monitor and control startup, shutdown, charging, discharging, and/or diagnostic operations of the PEMFC system 102. In certain embodiments, the control system 136 may be configured to detect and/or otherwise validate a leak in the PEMFC system 102 and/or implement any of the embodiments of the disclosed systems and methods.

Figure 2:
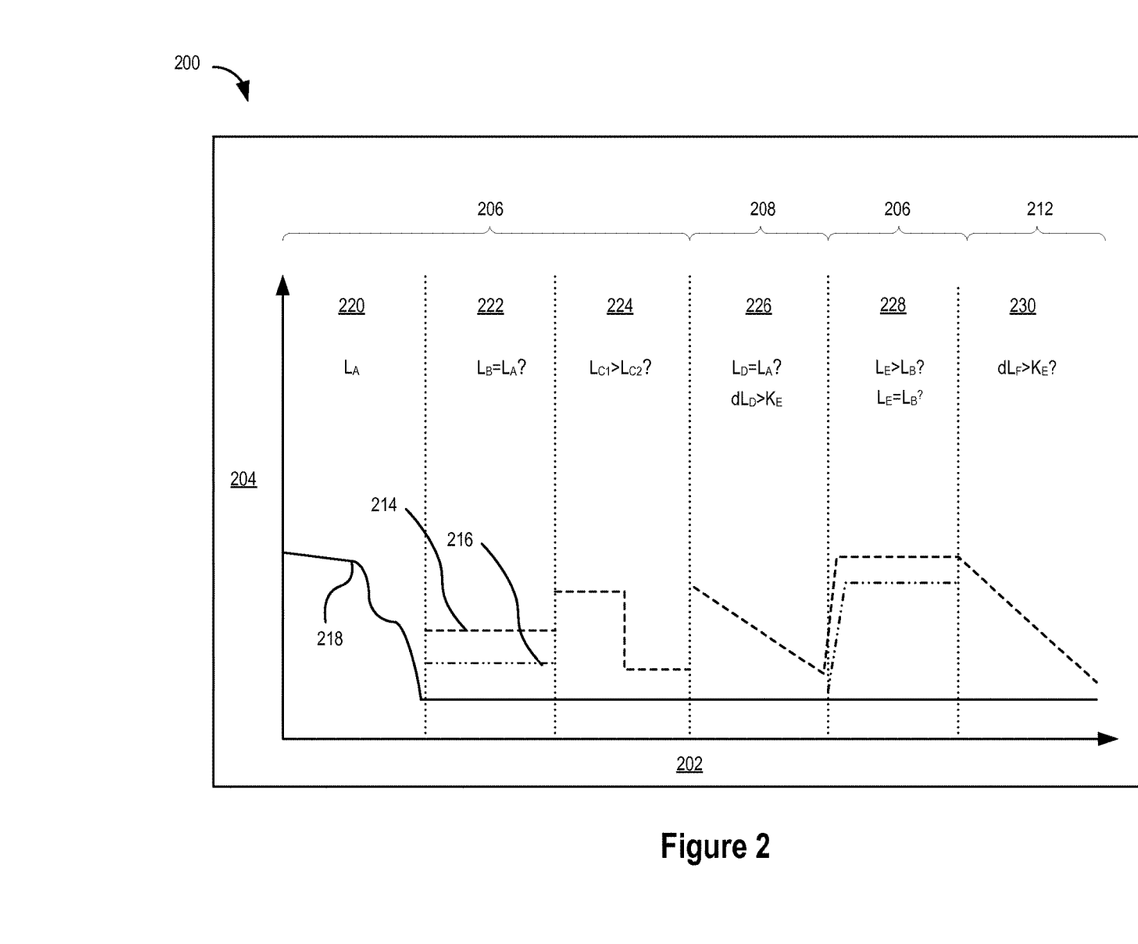
FIG. 2 illustrates a conceptual diagram of a method for detecting and validating a leak in a PEMFC system consistent with embodiments disclosed herein.

FIG. 2 illustrates a conceptual diagram 200 of a method for detecting and validating a leak in an anode subsystem of a PEMFC system consistent with embodiments disclosed herein. In certain circumstances, a leak flow associated with an $H_2$ leak in an anode subsystem may be calculated based on information obtained from monitoring a pressure decay of the anode subsystem when an associated injector is not firing (e.g., based on measured obtained from associated pressure sensors and/or the like). For example, pressure readings may begin to be stored following detection of a falling edge of a pulse associated with an injector control system and may stop being stored when the injector starts to fire again. Based on such readings, pressure decay of the anode subsystem may be determined.

A number of pressure reading samples may vary based, at least in part, on a current density of the PEMFC system where, at relatively high current density, injections are more frequent and/or the injector is active for relatively longer periods. At lower current densities, the injector may fire for a relatively shorter period, thereby allowing for more pressure readings during the relatively longer decay time. The pressure data may update with new readings when the injector stops firing again.

A variety of methods may be used to determine a leak flow rate from the anode subsystem based on the measured pressure information. For example, a leak flow rate may be determined based on a mass balance method and/or a pressure decay method. In certain embodiments, these methods may be based on the following:

$$\dot{n}_{leak} = \dot{n}_{inj} - \dot{n}_{cons} - \frac{\dot{P}V}{RT} \qquad \text{Equation 1}$$

Where $\dot{n}_{leak}$ is a leak flow, $\dot{n}_{inj}$ is an injector flow, $\dot{n}_{cons}$ is a $H_2$ consumption rate, and $$\frac{\dot{P}V}{RT}$$

is a flow rate due to a change in anode pressure. In certain embodiments, the mass balance method may be used at high power operating conditions when the injector off time is relatively shorter. The pressure decay method may be used at low power operating conditions when the injector off time is relatively longer.

In certain embodiments, a signal associated with a detected leak flow rate obtained using the aforementioned methods may be relatively noisy, making it difficult to determine when a leak initially occurs. The accuracy of the detected leak flow rate signal may also be dependent on the accuracy of pressure and current sensors used to obtain associated pressure and current information.

Consistent with embodiments disclosed herein, more accurate $H_2$ flow data may be obtained by adjusting certain PEMFC system operating parameters and/or conditions (e.g., system pressures and/or power levels) under a variety of operating and/or modes (e.g., FC stack run, idle/standby, and/or shutdown modes) and measuring flow data under such various operational conditions. For example, stack operating conditions may be adjusted during a FC stack run and/or idle/standby modes, and a resulting response in an associated detected leak flow rate signal may be monitored. During a FC stack shutdown mode, a decay rate of the anode system pressure when the injector is off may be monitored.

The method illustrated in connection with the conceptual diagram 200 of FIG. 2 may implement embodiments of the aforementioned systems and methods. The illustrated conceptual diagram 200 shows measured pressure 204 (e.g., measured in kPa) over time 202 of a cathode subsystem 216 and an anode subsystem 214 during various operational modes (e.g., run 206, standby/idle 208, shutdown 212). An exemplary current density 218 is also shown in relation to the various measured pressures 214, 216. The method may comprise a number of steps 220-230, each step being associated with an operational mode 206, 208, and 212 of the PEMFC system. For example, steps 220-224 and 228 may be associated with a run mode 206 of the PEMFC system, step 226 may be associated with a standby/idle mode 208 of the PEMFC system, and step 230 may be associated with a shutdown mode 212 of the PEMFC system. In some embodiments, a standby/idle mode 208 may be a subset operational mode of a run mode 206 where the PEMFC system is operating with relatively low current density.

At step 220, a leak flow rate may be continuously calculated based on a change in an anode subsystem pressure to generate a leak flow rate signal. When a leak flow rate signal level exceeds a first threshold and all anode valves are closed, a suspected anode subsystem leak may be identified. A suspected anode subsystem leak may be similarly identified based on a leak flow rate signal level exceeding a second threshold with all anode valves open, as may occur when a leak is due to the anode valves being suck open. Once a suspected anode subsystem leak is detected, an associated leak flow rate signal level may be stored, denoted herein as $L_A$. A current density of the PEMFC system and the anode-to-cathode pressure bias may also be stored.

After a leak flow rate, $L_A$, is stored, at step 222, set points for the current density 218 and an anode-to-cathode pressure bias may be adjusted to certain set levels. For example, the current density 218 may be set to 0.03 A/cm$^2$ and the anode-to-cathode pressure bias may be adjusted to 20 kPa, although other set levels may also be utilized in connection with the embodiments disclosed herein. Under these conditions, the new leak flow rate signal level, denoted herein as $L_B$, may be stored. In certain embodiments, the utilized set points may be identified based on leak characterization tests designed to emulate an $H_2$ leak in an anode subsystem, and may represent reference conditions for leak signal comparison purposes.

At step 224, the anode-to-cathode pressure bias may be increased. For example, the anode-to-cathode pressure bias may be adjusted from 20 kPa to 40 kPa, although other increases may also be utilized in connection with the embodiments disclosed herein. After the increase, the new leak flow rate signal level, denoted herein as $L_{C1}$, may be stored. By increasing the anode-to-cathode pressure bias, the anode pressure and the leak flow rate should increase, which may be confirmed by comparing $L_{C1}$ to $L_B$.

Following the increase of the anode-to-cathode pressure bias, the anode-to-cathode pressure bias may be decreased. For example, the anode-to-cathode pressure bias may be adjusted from 40 kPa to 10 kPa, although other decreases may also be utilized in connection with the embodiments disclosed herein. After the decrease, the new leak flow rate signal level, denoted herein as $L_{C2}$, may be stored. By decreasing the anode-to-cathode pressure bias, the anode pressure and the leak flow rate should decrease, which may be confirmed by comparing $L_{C2}$ to $L_B$. Similarly, $L_{C2}$ may be compared with $L_{C1}$. In the event of a leak in the anode subsystem, $L_{C1}$ should be greater than $L_{C2}$.

At step 226, the PEMFC system may be set to a standby/idle operating mode 208. During standby/idle operating mode 208 conditions, where the injector may fire at a relatively low frequency, more sample points may be available to calculate the pressure decay within the anode subsystem. Among other things, these additional sample points may allow for more accurate leak flow rate determination. In addition, the pressure decay rate in the anode subsystem may be monitored and abnormal monitored decay rates may be utilized to validate suspected leaks in the anode subsystem. The leak flow rate signal level, denoted herein as $L_D$, may be stored. In addition, the rate of change of the leak flow rate signal level, denoted herein as $dL_D$, may also be stored.

In certain embodiments, the rate of change of the leak flow rate signal level may be compared with a threshold decay rate, denoted herein as $K_E$. The threshold decay rate may be determined in a variety of ways. For example, in some embodiments, the threshold decay rate may comprise a decay rate calibrated to achieve acceptable leak detection validation performance. In certain embodiments, the threshold decay rate may be determined based on testing and/or characterization of a PEMFC system (e.g., a non-leaking system) to determine a nominal decay rate of the PEMFC system.

At step 228, a leak location in the PEMFC system may be determined. In certain embodiments, this determination may be performed while the PEMFC system may be set to a run operating mode 206. To identify a leak location in the PEMFC system, the cathode pressure may be increased. The anode-to-cathode pressure bias may be maintained. For example, the cathode pressure may be increased to 150 kPa, although other increases may also be utilized in connection with the embodiments disclosed herein, while the anode-to-cathode pressure bias may be maintained at 20 kPa. After the increase, the new leak flow rate signal level, denoted herein as $L_E$, may be stored. By maintaining the anode-to-cathode pressure bias and increasing the cathode pressure, if the leak flow rate signal level remains constant (i.e., $L_E=L_B$), then it may be determined that the leak is located in the cathode subsystem. If the leak flow rate signal level increases (i.e., $L_E>L_B$), then the leak location may be an overboard leak from the anode subsystem (e.g., a leak into ambient surroundings such as that caused by, without limitation, a PEMFC system plate seal leak, a leaking hydrogen injector, a hydrogen supply line leak, and/or the like).

In some embodiments, a leak may be confirmed at step 230 by monitoring a decay rate of the anode subsystem pressure during a shutdown mode 212 of the PEMFC system. If the decay rate of the anode subsystem pressure, denoted herein as $dL_F$, is faster than a threshold decay rate, a leak may be confirmed in the PEMFC system (i.e., a nominal decay rate less than the threshold decay rate may not be associated with a leak, whereas a faster decay rate exceeding the threshold may be associated with an abnormal condition such as an $H_2$ leak causing a faster pressure drop). If the decay rate of the anode subsystem pressure is slower than the threshold decay rate, a leak may not be confirmed in the PEMFC system.

In certain embodiments, steps 220-228 may be performed in a relatively short time period (e.g., 1 second or less). In certain embodiments, such a period may allow for leak identification and/or confirmation before onset of damage resulting from a more serious leak.

It will be appreciated that a number of variations can be made to the concepts presented in connection with FIG. 2 within the scope of the inventive body of work. For example, without limitation, in some embodiments, some or all of the steps 220-230 may be performed in different orders and/or during different operating modes 206-212. Thus it will be appreciated that FIG. 2 is provided for purposes of illustration and explanation, and not limitation.

Figure 3:
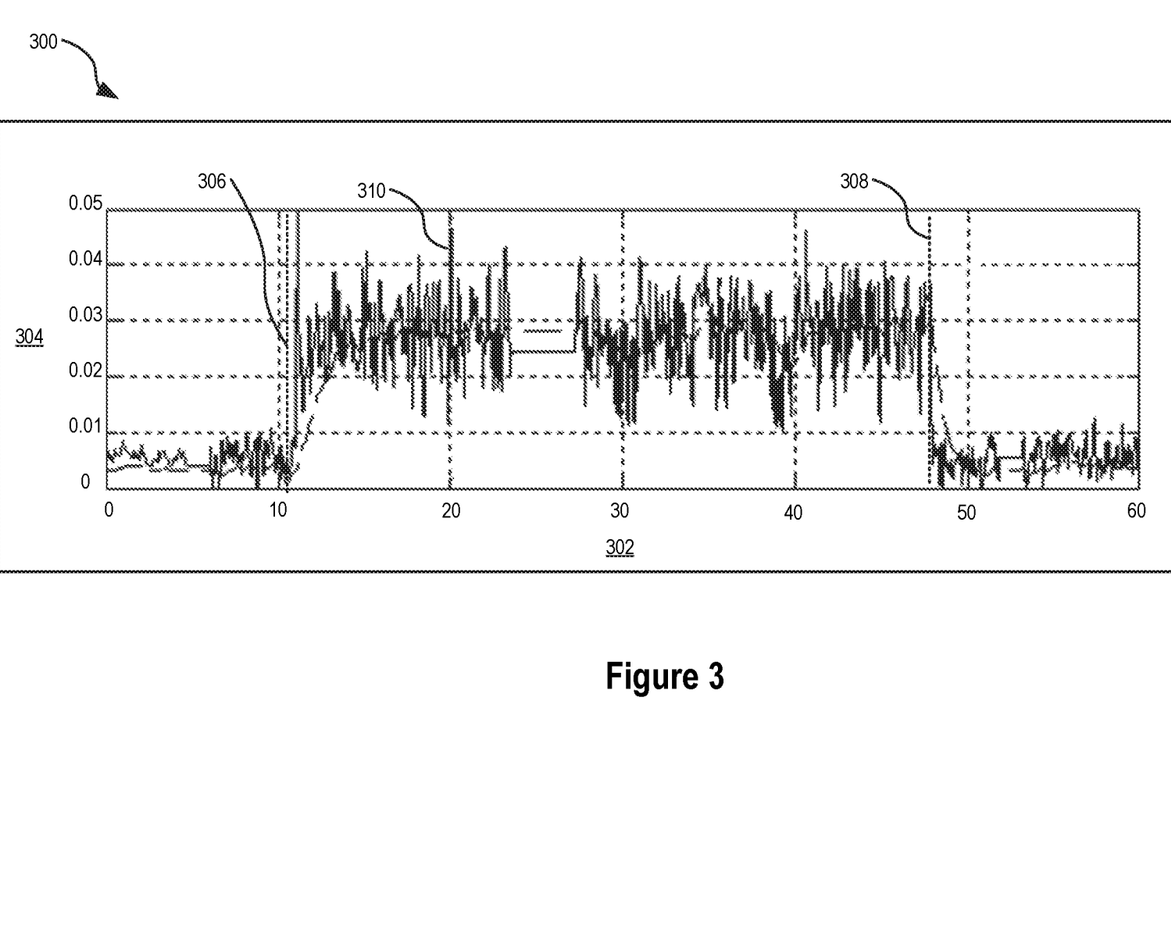
FIG. 3 illustrates a graph showing an exemplary estimation of leak flow over time during a simulated anode leak event consistent with embodiments disclosed herein.

FIG. 3 illustrates a graph 300 showing an exemplary estimation of leak flow rate 304 (e.g., measured in mols/sec) over time 302 (e.g., measured in seconds) during an anode leak event consistent with embodiments disclosed herein. Particularly, the graph 300 illustrates an exemplary detected leak flow rate signal 310 during a simulated leak beginning at time 306 and ending at time 308. As illustrated in connection with the graph 300, the detected leak flow rate signal 310 exhibits an increase following initiation of the simulated leak (i.e., following time 306) and a decrease following termination of the simulated leak (i.e., following time 308). Consistent with embodiments disclosed herein, a leak in an anode subsystem of a PEMFC system may be validated based, at least in part, on such a leak flow rate signal.

Figure 4:
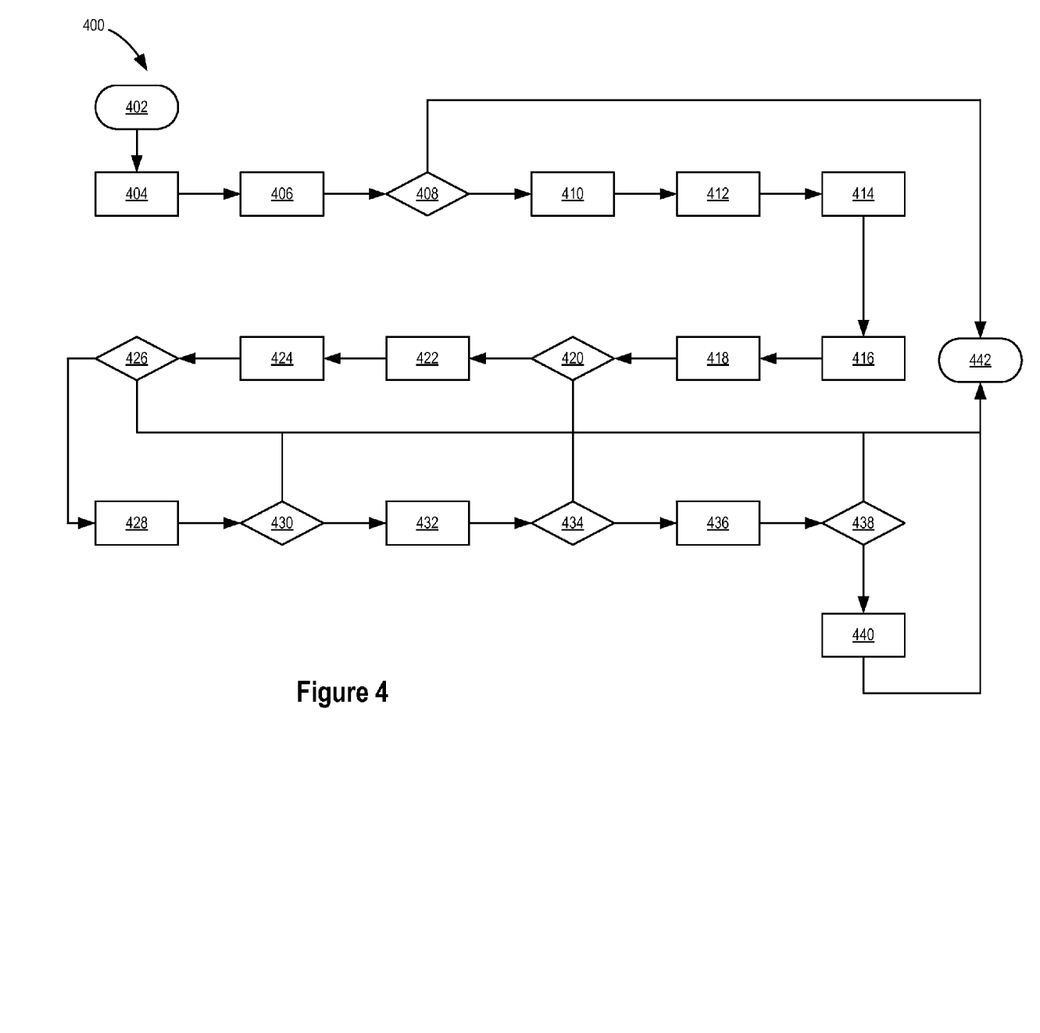
FIG. 4 illustrates a flow chart of an exemplary method for detecting and validating a leak in a FC system consistent with embodiments disclosed herein.

FIG. 4 illustrates a flow chart of an exemplary method 400 for detecting a leak in a PEMFC system consistent with embodiments disclosed herein. The illustrated method 400 may be performed using, at least in part, a control system and/or one or more valves, pressure regulators and/or sensors, current sensors (e.g., current density sensors), flow rate sensors, and/or the like associated with a PEMFC system, although other suitable systems and/or combination of systems may also be utilized.

The method 400 may begin at 402. In certain embodiments, the method 400 may initiate based on the PEMFC entering a run operating model. Under such an operating mode, anode subsystem pressure information may be continuously and/or periodically monitored (e.g., based on Equation 1 and/or the like) to identify and/or validate suspected leaks consistent with embodiments disclosed herein.

At 404, anode subsystem pressure information may be received. In certain embodiments, the anode subsystem pressure information may be received from one or more pressure sensors associated with the anode subsystem of the PEMFC system. A leak flow rate may be calculated at 406 based, at least in part, on the anode subsystem pressure information to generate a leak flow rate signal.

A determination may be made at 408 as to whether the leak flow rate signal exceeds a leak flow rate threshold. In certain embodiments, the leak flow rate threshold may be determined based on testing and/or otherwise characterizing a simulated overboard leak in an anode subsystem of a PEMFC system (e.g., via leak detection tests). In some embodiments, the threshold may comprise a minimum detectable signal threshold for detecting an overboard leak in the PEMFC system. For example, in some embodiments, a controlled flow rate of a simulated overboard leak may be reduced until an associated flow rate signal reaches a detection threshold (e.g., a minimum detection threshold). Such a threshold may then be utilized as the leak flow rate threshold in connection with the disclosed embodiments. If the leak flow rate signal exceeds the leak flow rate threshold, a leak may be suspected and the method 400 may proceed to 410.

If the leak flow rate signal does not exceed the leak flow rate threshold, the method 400 may proceed to terminate at 442.

At 410, a first flow rate signal level associated with the signal level used in the determination at 408 may be stored. The anode-to-cathode pressure bias and the current density of the PEMFC system may be adjusted to certain set levels at 412. For example, in certain embodiments, the anode-to-cathode pressure bias may be set to 20 kPa and the current density may be set to 0.03 A/cm$^2$, although other set levels may also be utilized in connection with the embodiments disclosed herein. In certain embodiments, the set levels may be identified based of leak characterization tests designed to emulate an H$_2$ leak in an anode subsystem, and may represent reference conditions for leak signal comparison purposes.

A second flow rate signal level associated with the signal level occurring after the adjustment at 412 may be stored at 414. After storing the second flow rate signal level, the anode-to-cathode pressure bias may be increased at 416. For example, the anode-to-cathode pressure bias may be adjusted from 20 kPa to 40 kPa, although other increases may also be utilized in connection with the embodiments disclosed herein. After the increase, a third flow rate signal level may be stored at 418.

At 420, a determination may be made as to whether the third flow rate signal level is greater than the second flow rate signal level. If the third flow rate signal level is less than the second flow rate signal level, a leak may not be suspected and the method 400 may proceed to terminate at 442. Increasing the anode-to-cathode pressure bias in the event of a leak may result in creased anode pressure and an increased leak flow rate. Accordingly, if the third flow rate signal level is greater than the second flow rate signal level, a leak may be suspected and the method 400 may proceed to 422.

The anode-to-cathode pressure bias may be decreased at 422. For example, the anode-to-cathode pressure bias may be adjusted from 40 kPa to 10 kPa, although other decreases may also be utilized in connection with the embodiments disclosed herein. After the decrease, a fourth flow rate signal level may be stored at 424.

At 426, the fourth flow rate signal level may be compared to the second flow rate signal level and the third flow rate signal level to determine if the fourth flow rate signal level is greater than the second and third signal levels. By decreasing the anode-to-cathode pressure bias, the anode pressure and the leak flow rate should decrease. Accordingly, if the second and third flow rate signal levels are greater than the fourth flow rate signal level, a leak may be suspected and the method 400 may proceed to 428. Otherwise, the method 400 may proceed to terminate at 442.

The PEMFC system may be set to a standby/idle operating mode at 428 and a pressure decay rate in the anode subsystem may be monitored. During such an operating mode, an injector of the PEMFC system may fire at a relatively low frequency, allowing for more sample points to be used in connection with monitoring the pressure decay within the anode subsystem. At 430, the monitored pressure decay rate may be compared with a pressure decay rate threshold (e.g., a threshold associated with a nominal decay rate obtained through system testing and/or characterization and/or the like). If the monitored pressure decay rate exceeds the pressure decay rate threshold, a leak may be suspected and the method 400 may proceed to 432. Otherwise, the method 400 may proceed to terminate at 422.

At 432, to identify a leak location in the PEMFC system, the PEMFC system may be set to an operating mode, the cathode subsystem pressure may be increased, and the anode-to-cathode pressure bias may be maintained. For example, the cathode pressure may be increased to 150 kPa, although other increases may also be utilized in connection with the embodiments disclosed herein, while the anode-to-cathode pressure bias may be maintained at 20 kPa.

After the increase, it may be determined whether the leak flow rate is constant at 434. If the leak flow rate is constant, it may be determined that the leak location is in the cathode subsystem, and the method 400 may proceed to terminate at 442. If the leak flow rate increases, it may be determined that the leak is in the anode subsystem and/or an overboard location, and the method 400 may proceed to 436.

At 436, the pressure decay rate in the anode subsystem may be monitored. In certain embodiments, this pressure decay rate may be monitored during a shutdown mode of the PEMFC system. At 438, the pressure decay rate may be compared with a reference threshold decay rate. In certain embodiments, the threshold decay rate may be determined based on testing and/or characterization of a PEMFC system to identify a nominal decay rate. If the pressure decay rate is not faster than the threshold decay rate, the leak may not be confirmed and the method 400 may proceed to terminate at 422. If the pressure decay rate, however, is faster than the threshold decay rate, the method 400 may proceed to 440 where a leak may be confirmed in the anode subsystem and the PEMFC may engage in one or more protective actions (e.g., actions to prevent damage to the system). For example, in certain embodiments, the PEMFC system may be switched to a shutdown mode wherein, among other operations, air may be pumped into the PEMFC stack. In further embodiments, the PEMFC system may engage in quick stop (e.g., a rapid transition from a run mode to a stop mode) whereby hydrogen injection in the PEMFC system may be rapidly terminated. The method 400 may proceed to terminate at 442.

Certain systems and methods disclosed herein may be implemented, at least in part, using one or more computer systems. For example, in certain embodiments, a control system associated with a PEMFC system may be implemented, at least in part, using one or more computer systems. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, the systems and methods disclosed herein may be utilized in FC systems not included in a vehicle (e.g., as in back-up power sources or the like). It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "in communication," "coupled," "coupling," and any other variation thereof are intended to encompass a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method for validating a leak in a subsystem of a fuel cell system, the method comprising:
    determining that a first measured leak flow rate in the anode subsystem exceeds a first reference flow rate threshold;
    adjusting an anode-to-cathode pressure bias and a current density of the fuel cell system to reference levels;
    after adjusting the anode-to-cathode pressure bias and current density to the reference levels, measuring a second measured leak flow rate;
    comparing a plurality of measured leak flow rates obtained at a plurality of anode-to-cathode pressure bias levels with the second measured leak flow rate;
    identifying a leak based on the comparison; and
    identifying a leak location in the fuel cell system, wherein identifying the leak location comprises:
        increasing a pressure in the cathode subsystem of the fuel cell system;
        after increasing the pressure in the cathode subsystem, measuring a third measured leak flow rate; and
        identifying whether the leak location is one of an air leak from the cathode subsystem or a fuel leak from the anode subsystem based on a comparison between the third measured leak flow rate with the second measured leak flow rate,
    wherein identifying a leak location in the cathode subsystem comprises determining that the third measured leak flow rate is substantially similar to the second measured leak flow rate and, based on the determination, identifying an air leak location in the cathode subsystem, and
    wherein identifying a leak location in the anode subsystem comprises determining that the third measured leak flow rate is greater than the second measured leak flow rate and, based on the determination, identifying a fuel leak location in the anode subsystem.

2. The method of claim 1, wherein comparing the plurality of measured leak flow rates obtained at the plurality of anode-to-cathode pressure bias levels further comprises:
    increasing the anode-to-cathode pressure bias;
    after increasing the anode-to-cathode pressure bias, determining that a fourth measured leak flow rate exceeds the second measured leak flow rate;
    decreasing the anode-to-cathode pressure bias; and
    after decreasing the anode-to-cathode pressure bias, determining that a fifth measured leak flow rate is less than the second measured leak flow rate and fourth measured leak flow rate.

3. The method of claim 1, wherein the method further comprises:
    confirming the identified leak, wherein the confirming comprises:
        monitoring a pressure decay rate of the anode subsystem during a shutdown operation of the fuel cell system;
        determining that the decay rate is faster than a reference threshold decay rate; and
        confirming the identified leak based, at least in part, on the determination.

4. The method of claim 1, wherein the method further comprises implementing at least one protective action in response to identifying the leak to mitigate damage to the fuel cell system.

5. The method of claim 4, wherein the protective action comprises initiating a shutdown operation of the fuel cell system.

6. The method of claim 4, wherein the protective action comprises terminating injection of hydrogen in the fuel cell system.

7. A non-transitory computer-readable storage medium storing instructions that, when executing by a processor, cause the processor to perform a method of validating a leak in a subsystem of a fuel cell system, the method comprising:
    determining that a first measured leak flow rate in the anode subsystem exceeds a first reference flow rate threshold;

adjusting an anode-to-cathode pressure bias and a current density of the fuel cell system to reference levels;
after adjusting the anode-to-cathode pressure bias and current density to the reference levels, measuring a second measured leak flow rate;
comparing a plurality of measured leak flow rates obtained at a plurality of anode-to-cathode pressure bias levels with the second measured leak flow rate;
identifying a leak based on the comparison; and
identifying a leak location in the fuel cell system, wherein identifying the leak location comprises:
increasing a pressure in the cathode subsystem of the fuel cell system;
after increasing the pressure in the cathode subsystem, measuring a third measured leak flow rate; and
identifying whether the leak location is one of an air leak from the cathode subsystem or a fuel leak the anode subsystem based on a comparison between the third measured leak flow rate with the second measured leak flow rate,
wherein identifying a leak location in the cathode subsystem comprises determining that the third measured leak flow rate is substantially similar to the second measured leak flow rate and, based on the determination, identifying an air leak location in the cathode subsystem, and
wherein identifying a leak location in the anode subsystem comprises determining that the third measured leak flow rate is greater than the second measured leak flow rate and, based on the determination, identifying a fuel leak location in the anode subsystem.

8. The non-transitory computer-readable storage medium of claim 7, wherein comparing the plurality of measured leak flow rates obtained at the plurality of anode-to-cathode pressure bias levels further comprises:
increasing the anode-to-cathode pressure bias;
after increasing the anode-to-cathode pressure bias, determining that a fourth measured leak flow rate exceeds the second measured leak flow rate;
decreasing the anode-to-cathode pressure bias; and
after decreasing the anode-to-cathode pressure bias, determining that a fifth measured leak flow rate is less than the second measured leak flow rate and fourth measured leak flow rate.

9. The non-transitory computer-readable storage medium of claim 7, wherein the method further comprises:
confirming the identified leak, wherein the confirming comprises:
monitoring a pressure decay rate of the anode subsystem during a shutdown operation of the fuel cell system;
determining that the decay rate is faster than a reference threshold decay rate; and
confirming the identified leak based, at least in part, on the determination.

10. The non-transitory computer-readable storage medium of claim 7, wherein the method further comprises implementing at least one protective action in response to identifying the leak to mitigate damage to the fuel cell system.

11. The non-transitory computer-readable storage medium of claim 10, wherein the protective action comprises initiating a shutdown operation of the fuel cell system.

12. The non-transitory computer-readable storage medium of claim 10, wherein the protective action comprises terminating injection of hydrogen in the fuel cell system.

* * * * *